(12) United States Patent
Patel et al.

(10) Patent No.: US 10,243,898 B2
(45) Date of Patent: *Mar. 26, 2019

(54) MESSAGE DELIVERY MANAGEMENT BASED ON DEVICE ACCESSIBILITY

(71) Applicant: International Business Machines Corporation, Armonk, NY (US)

(72) Inventors: Apurva S. Patel, Pune (IN); Prasad P. Purandare, Pune (IN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/839,525

(22) Filed: Dec. 12, 2017

(65) Prior Publication Data

US 2018/0102994 A1    Apr. 12, 2018

Related U.S. Application Data

(63) Continuation of application No. 15/249,546, filed on Aug. 29, 2016.

(51) Int. Cl.
  G06F 15/16 (2006.01)
  H04L 12/58 (2006.01)
  H04L 12/26 (2006.01)

(52) U.S. Cl.
  CPC ............ H04L 51/066 (2013.01); H04L 43/08 (2013.01); H04L 51/043 (2013.01); H04L 51/06 (2013.01)

(58) Field of Classification Search
  CPC . H04L 51/06–51/10; H04L 67/2823–67/2828; H04L 51/00; H04L 51/04
  See application file for complete search history.

(56) References Cited

U.S. PATENT DOCUMENTS

| 7,103,806 | B1 | 9/2006 | Horvitz |
| 7,787,864 | B2 | 8/2010 | Provo |
| 7,924,998 | B2 | 4/2011 | Seligmann |
| 8,019,834 | B2 | 9/2011 | Horvitz et al. |
| 8,672,482 | B2 | 3/2014 | Vertegaal et al. |
| 8,880,047 | B2 | 11/2014 | Konicek et al. |
| 8,949,363 | B2 | 2/2015 | Gray |

(Continued)

FOREIGN PATENT DOCUMENTS

EP    2291753 A2    3/2011

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

(Continued)

*Primary Examiner* — Brendan Y Higa
(74) *Attorney, Agent, or Firm* — Jared L. Montanaro

(57) ABSTRACT

A processor may receive an electronic message for delivery to a user on a first device. The electronic message may have a first format. The processor may identify one or more features of the first format of the electronic message. The processor may determine whether the one or more features of the first format are supported by a second device. The processor may transform the first format of the electronic message to a second format used by the second device.

7 Claims, 8 Drawing Sheets

(56) References Cited

U.S. PATENT DOCUMENTS

| | | |
|---|---|---|
| 9,524,329 B2 | 12/2016 | Dun et al. |
| 2002/0160757 A1 | 10/2002 | Shavit et al. |
| 2003/0093565 A1* | 5/2003 | Berger ............... H04L 29/06 709/246 |
| 2004/0199663 A1* | 10/2004 | Horvitz .............. G05B 19/404 709/238 |
| 2005/0165913 A1* | 7/2005 | Coulombe ........... H04L 51/066 709/219 |
| 2005/0169444 A1* | 8/2005 | Inon .................... H04N 7/147 379/88.18 |
| 2006/0218234 A1* | 9/2006 | Deng ................... H04L 51/066 709/206 |
| 2011/0205949 A1 | 8/2011 | Maenpaa et al. |
| 2012/0173650 A1* | 7/2012 | Ye ....................... H04L 51/066 709/206 |

OTHER PUBLICATIONS

Patel et al., "Message Delivery Management Based on Device Accessibility," U.S. Appl. No. 15/249,542, filed Aug. 29, 2016.
Patel et al., "Message Delivery Management Based on Device Accessibility," U.S. Appl. No. 15/839,551, filed Dec. 12, 2017.
Patel et al., "Message Delivery Management Based on Device Accessibility," U.S. Appl. No. 15/249,546, filed Aug. 29, 2016.
List of IBM Patents or Patent Applications Treated as Related, Dec. 12, 2017, 2 pgs.
Patel et al., "Message Delivery Management Based on Device Accessibility," U.S. Appl. No. 16/032,967, filed Jul. 11, 2018.
Patel et al., "Message Delivery Management Based on Device Accessibility," U.S. Appl. No. 16/033,003, filed Jul. 11, 2018.
List of IBM Patents or Patent Applications Treated as Related, Jul. 11, 2018, 2 pgs.

\* cited by examiner

MESSAGE DELIVERY MANAGEMENT BASED ON DEVICE ACCESSIBILITY

BACKGROUND

The present disclosure relates generally to the field of electronic message delivery, and more specifically to delivering an electronic message based on user accessibility.

A user may own multiple devices (e.g., a mobile phone, a tablet, a desktop computer, etc.). Each device may have different capabilities and support different formats of an electronic message. The user may only be able to interact with one device at a time and an electronic message sent to the one of the devices may not be responded to, or left unread, until the user is done using interaction with one of the other devices.

SUMMARY

Embodiments of the present disclosure include a method, computer program product, and system for transforming an electronic message from a first format to a second format. A processor may receive an electronic message for delivery to a user on a first device. The electronic message may have a first format. The processor may identify one or more features of the first format of the electronic message. The processor may determine whether the one or more features of the first format are supported by a second device. The processor may transform the first format of the electronic message to the second format used by the second device.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
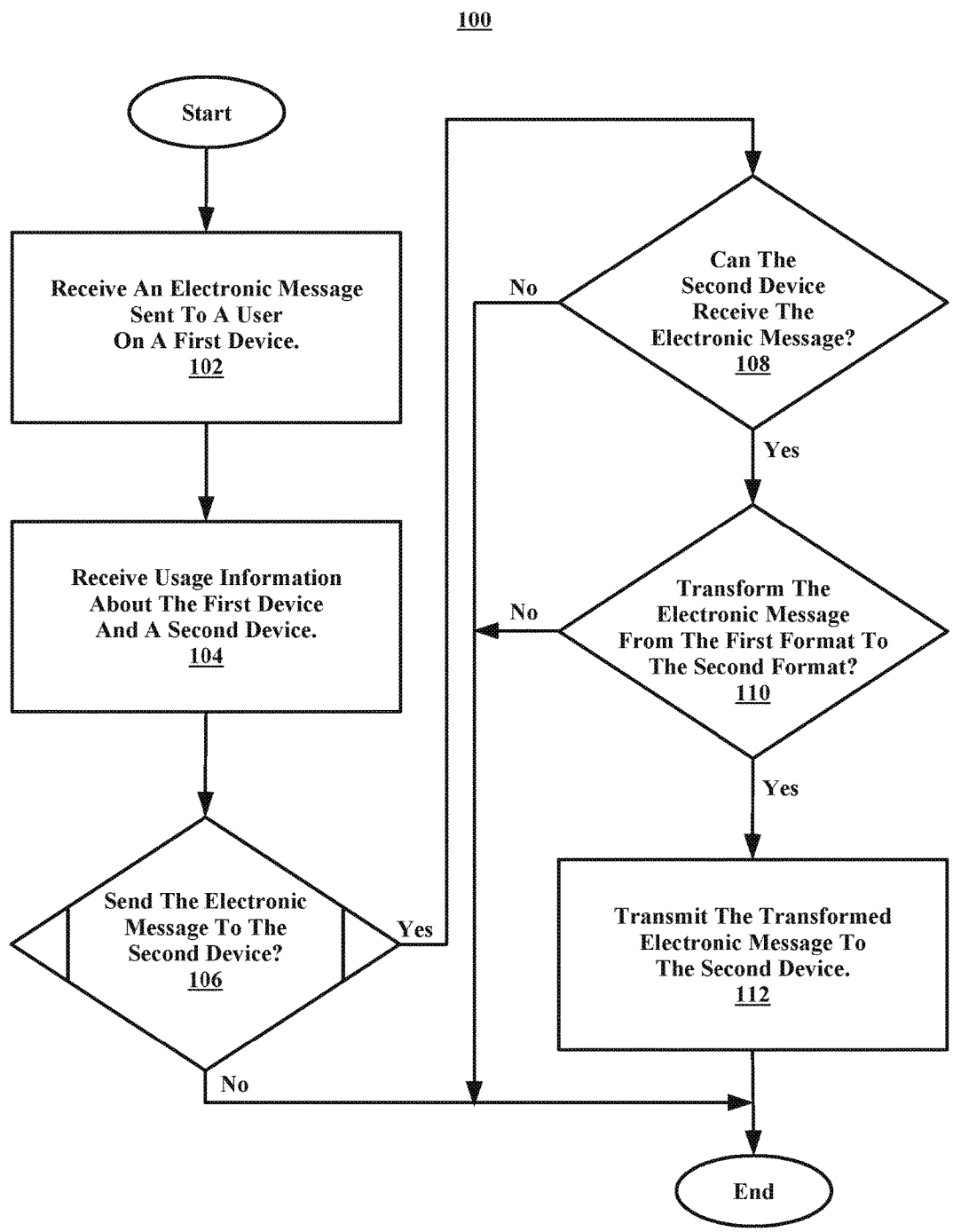
FIG. 1 illustrates a flowchart depicting an example method for transforming and sending an electronic message to a second device, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of present disclosure relate generally to the field of electronic message delivery, and more specifically to delivering an electronic message to a device currently most accessible by a user. Further aspects of the present disclosure relate to transforming an electronic message from a first format to a second format. While the present disclosure is not necessarily limited to such applications, various aspects of the disclosure may be appreciated through a discussion of various examples using this context.

A user may own multiple devices capable of receiving electronic messages (e.g., also referred to herein simply as "messages"). The user may focus on one device at a time and may wish to receive electronic messages directly to the one device rather than having an electronic message delivered (e.g., sent, received, etc.) to another device that currently may not be accessible to, or in use, by the user. For example, a user may be reading on a tablet and an electronic message may be meant for delivery to a cellphone owned by the user. The user may wish to have the message automatically delivered to the tablet instead of, or in addition to, the cellphone.

In some embodiments, a processor (e.g., computer system, server, telecomm, etc.) may receive an electronic message sent to a first device associated with a user. The electronic message may have a first format. The processor may receive usage information about the first device and a second device associated with the user. The processor may determine whether to send the electronic message to the second device based on the received usage information. The second device may be capable of receiving messages having a second format. The processor may determine whether to transform the electronic message from the first format to the second format. The processor may transmit the transformed electronic message to the second device. In some embodiments, the processor may determine to send the electronic message to the second device based on the user's association with the relevant second device (e.g., the processor may determine that the second device is nearest the user, etc.). In some embodiments, format may include features supported by a device (e.g., audio, video, etc.) and message types (e.g., MP3, MPEG, MP4, etc.). In some embodiments, format may include only features supported by a device or message types.

In some embodiments, the second format may be an appropriate readable format for the second device. In some embodiments, the second format may be suitable to be used by a graphical user interface (GUI). For example, a processor may receive an audio-electronic message (e.g., a voicemail message) to be delivered to a user on a mobile device. The processor may identify a desktop computer that may currently be used by the user to send the electronic message to. The desktop computer may use an audiovisual (AV) format (e.g., the appropriate readable format for the desktop computer) as opposed to the audio format of the electronic message for delivery to the mobile device. The processor may transform the audio format into an AV format and transmit the transformed (e.g., AV) electronic message to the desktop computer to display to the user (e.g., displaying the message on the desktop computer as subtitles or plain text). In some embodiments, the second format may be the same as the first format.

In some embodiments, the processor may receive usage information about the first device and the second device. In some embodiments, the process may determine whether to send the electronic message to the second device based on the received usage information. In some embodiments, the processor may compare the usage information about the first device and the second device and determine, based on the comparing, whether to send the electronic message to the second device. In some embodiments, the processor may compare the usage information by generating an accessibility score for each associated device. The accessibility scores may be based on user accessibility, capabilities of each associated device, state information about each associated device, and/or message format.

For example, a processor may receive information that the first device has not been used for one hour. The processor may also receive information that the second device has not been used for one minute. The processor may compare the usage information and determine that the second device should be sent the electronic message because the second device is more likely to be currently used by, or accessible to, a user. In some embodiments, the processor may have a range of time for non-usage of a device, such as 1 second to 5 minutes, which may indicate that the device may be in current use by the user. In some embodiments, the processor may decide not to send the electronic message to the second device if the first device has been used within a predetermined range of time, such as 1 second to 3 minutes (e.g., the processor may assume that the first device is currently being used, or accessible by, the user).

In some embodiments, the usage information about the first and second devices may include power state information. In some embodiments, when the processor receives usage information about the first and second devices, the processor may determine that the first device is in a low-energy power state (e.g., the first device is currently off, in sleep mode, has a low battery, etc.) and the processor may determine that the second device is in a high-energy power state (e.g., the second device is currently on, using power to run an application, etc.). Accordingly, the processor may prioritize (e.g., rank, score, etc.) the second device over the first device.

For example, a processor may receive an electronic message sent to a laptop. The processor may receive usage information indicating that the laptop is powered off and that a Bluetooth enabled radio in a car owned by a user is passively on (e.g., the radio itself is not on but the car is running with latent power going to the radio). The processor may transform the electronic message (e.g., from a first format, such as a text format) into an appropriate form supported by the radio (e.g., an audio format) and transmit the transformed electronic message to the radio. For example, the processor may transform the electronic message using a text-to-speech application. In some embodiments, the processor may actively turn on the radio and broadcast the transformed electronic message to the user. In some embodiments, the radio may already be broadcasting to the user and the processor may pause the broadcasting to relay the electronic message to the user. In some embodiments, the processor may prompt the user to interrupt the broadcast in order to allow the electronic message to be relayed.

In some embodiments, the usage information about the first and second devices includes user interaction information. In some embodiments, when the processor receives usage information about the first and second devices, the processor may determine a first accessibility score for the first device based on the user interaction information. The user interaction information may include the number of times the user has interacted with the first device in a given time period. The processor may also determine a second accessibility score for the second device based on the user interaction information for the second device in the same time period.

For example, a processor may receive information that a user has a smart television (e.g., a first device) and a cellphone (e.g., a second device). The processor may additionally receive information that the smart television has had the user's eyes gazed (e.g., using eye-gazing technology that uses built-in cameras to identify that a user is looking at the device) on the smart television for 5 minutes of the past hour. The processor may also receive information that the cellphone has been gazed upon by the user for 55 minutes of the past hour. The processor may use a count system associated with the 60 minutes in an hour, increasing the accessibility score of the smart television up to 5, one count for each minute the user gazed at the smart television. The processor may also increase the accessibility score of the cellphone by 55.

In some embodiments, when determining the first and second accessibility scores for the first and second devices, respectively, the processor may rank the first and second devices based on the first and second accessibility scores. In some embodiments, the processor may rank the first and second devices by determining that the first device has a lower accessibility score than the second device. The processor may then rank the first device lower than the second device.

Following the example above, the processor may rank the cellphone above the smart television as the device most accessible or the device currently being used by the user. The processor may rank the cellphone above the smart television in response to the 55 counts given to the cellphone as opposed to the 5 counts given to the smart television. In some embodiments, the electronic message may be redirected to a second device if the electronic message is a high priority message. In some embodiments, a user may set the priority of a message. For example, a user may set messages from "Mom," as a high priority and messages from "Brother-in-law," as low priority. The messages sent from "Mom" may be the only messages transformed and redirected to a second device associated with the user.

In some embodiments, when ranking the first and second devices based on the first and second accessibility scores, the processor may weight the first and second accessibility scores. In some embodiments, the processor may weight the first and second accessibility scores based on whether the first and second devices are preferred devices (e.g., the user has prompted the processor to giver preference to one device over another, the processor has determined that a user favors one device, etc.).

For example, the user may own a tablet, a laptop, and a music player. The user may enable a function that lets the processor know that the user does not want electronic messages sent to the music player when the music player is in use (e.g., the music player is a non-preferred device to send electronic messages to). The processor may receive user interaction information and give a higher initial accessibility score to the music player than the laptop and tablet because the music player is being played. However, the processor may weight the accessibility score down to zero because the user has indicated that the music player is a non-preferred device while the music player is being used. In some embodiments, the user may mark a device as a preferred device to send electronic messages to while the device is being used.

In some embodiments, the processor may weight the first and second accessibility scores based on the capabilities of the first and second devices. For example, a first device may only allow for audio features and a second device may allow for audio and visual features. The first device may have a higher accessibility score than the second device. However, the processor may weight the second device's accessibility score higher than the first device because the second device is capable of relaying an electronic message in both an audio and visual form. In some embodiments, the processor may weight the accessibility score of the first and second devices based on devices' capabilities if the first and second accessibility counts are within a certain range (e.g., the first and second devices' accessibility score are within 3 counts of each other, etc.).

In some embodiments, the processor may weight the first and second accessibility scores based on the format of the electronic message. For example, a first device may have a text feature and a second device may have an audio feature. An electronic message may be sent to a user in a text format. The processor may receive an initial accessibility score for the second device that is higher than the accessibility score for the first device. However, the processor may weight the accessibility score for the first device higher than the accessibility for the second device because the first device is capable of relaying the electronic message to the user. In some embodiments, the processor may weight the accessibility score of the first and second devices based on devices' capabilities if the first and second accessibility counts are within a certain range.

In some embodiments, the processor may determine whether to transform the electronic message from the first format to the second format. For example, a processor may receive an electronic message in image file format to be delivered to a first device. The processor may identify a second device to send the electronic message. The processor may identify that the second device as capable of receiving the electronic message in an audio format, but not the image file format. The processor may transform the electronic message from the image file format to the audio format in order to transmit the electronic message to the second device.

In some embodiments, when transforming the electronic message from the first format to the second format, the processor may determine features associated with the first format. The processor may also determine features associated with the second format and hide the features associated with the first format that are not supported by the second format. For example, a processor may receive an electronic message in an audiovisual format meant for delivery to a first device. The processor may identify a second device currently being used by a user. The processor may additionally identify the second device as only using a visual format.

The processor may determine that the features associated with the audiovisual format are the ability to play a sound file and display a video file. The processor may also determine the feature associated with the visual format supported by the second device is the ability to display a video file. The processor may transform (e.g., using speech-to-text, subtitles, etc.) the audiovisual format of the electronic message into the visual format by hiding the sound file of the electronic message. The processor may hide the sound file in order for the sound file to be played at a later time on a device suited for audio. In some embodiments, the processor may remove (e.g., delete) the features not supported by the second format. In some embodiments, the processor may add features supported by the second format to the electronic message. In some embodiments, the second format has every feature of the first format plus one or more features.

In some embodiments, the processor may transmit the transformed electronic message to the second device. For example, a processor may receive an electronic message for delivery to a user on a first device; the first device may support raster graphics formats (e.g., JPEG, PNG, GIF, etc.) in electronic messages. The processor may identify, however, that a user is currently using a second device. The processor may additionally identify that the second device may support vector graphics formats (e.g., DXF, EPS, etc.) in electronic messages.

The processor may transform the electronic message from the raster graphics format used by the first device to the vector graphics format used by the second device. The processor may transmit the transformed electronic message to the second device to be displayed to the user. In some embodiments, when transmitting the transformed electronic message to the second device, the processor may pause the normal functions of the second device. For example, if the second device is a smart television, the processor may pause the program being watched by a user to transmit and display the electronic message to the user. It is noted that the steps described above may not be performed in such an order and may be performed in any order or not at all.

In some embodiments, a processor (e.g., on a system, computer system, server, etc.) may be configured to receive an electronic message for delivery to a user on a first device. The electronic message may have a first format. The processor may identify one or more features of the first format of the electronic message. The processor may determine whether the one or more features of the first format are supported by a second device that supports a second format (e.g., the processor may determine the usability of the features by the second device). The processor may transform the first format of the electronic message to the second format used by the second device.

In some embodiments, the processor may determine whether the one or more features of the first format are supported by the second device by determining a second format used by the second device. The processor may also identify one or more features of the second format and compare the one or more features of the first format to the one or more features of the second format. For example, a processor may receive an electronic message in an AV format (e.g., a first format). The processor may determine that the AV format contains the features of a sound file and a video file. The processor may determine that a second device uses an audio format (e.g., a second format) and identify the feature of the audio format as a sound file. The processor may compare the features of the AV format to the audio format and determine that the audio file used by the first format may be used by the second format, but that the video file may not. The processor may transform the first format of the electronic message to the second format by hiding the video file feature associated with the AV format. In some embodiments, hiding means only transmitting the supported features.

In some embodiments, when the processor is comparing the one or more features of the first format to the one or more features of the second format, the processor may determine that at least one of the one or more features of the first format is supported by the second format and that at least one of the one or more features of the first format is not supported by the second format. For example, the first format may have a closed-caption feature and a pause video feature. The second format may have a closed-caption feature and a fast forward feature. The processor may determine that the closed-caption feature is supported by the second format and that the pause video feature is not supported by the second format. The processor may transform the first format to allow the fast forward feature and remove the pause feature.

In some embodiments, all or none of the features of the first format may be supported by the second format. In some embodiments, the processor may determine that at least one of the features of the first format is similar or equivalent to at least one feature of the second format and is supported by the second format. For example, the first format may have a closed-caption feature and the second format may have a speech-to-text feature. The processor may determine that the closed-caption feature is equivalent to the speech-to-text feature and supported by the second format because the closed-caption feature functions as an audio (e.g., speech)-to-text feature.

In some embodiments, the processor may transform the first format of the electronic message to the second format by determining the one or more features of the first and second formats. The processor may then remove at least one of the one or more features of the first format that are not supported by the second format. For example, a processor may determine that a first format has the features of resolution control and frame-rate control. The processor may also determine that a second format has the features of resolution control and contrast control. The processor may remove the frame-rate control feature from the first format because it is not supported by the second format.

In some embodiments, when transforming the first format of the electronic message to the second format, the processor may generate a copy of the electronic message in its original form (e.g., the first format). The processor may store the copy of the first format of the electronic message. For example, a processor may receive an electronic message having a first format for delivery to a user on a first device. The processor may identify and determine one or more features of the first format supported on a second device that uses a second format.

The processor may copy the first format of the electronic message, so as to have an original version and a copy of the first format. The processor may store the copy of the first format in order to retain an unchanged version (e.g., first format) of the electronic message. This may help if the processor determines that the first format is viable for delivery to the first device over the second device. The processor may simultaneously, or in addition to, transform the original version of the first format of the electronic message into the second format of the electronic message for delivery to the user on the second device. In some embodiments, the original version of the first format may remain unchanged and the copy of the first format may be transformed. In some embodiments, the processor may keep original messages in a database for the user to look at later (e.g., when the user has a device capable of viewing the messages in their original forms).

Referring now to FIG. 1, illustrated is flowchart of an example method 100 for transforming and sending an electronic message to a second device, according to embodiments of the present disclosure. A processor on a device (e.g., smartphone, smart watch, computer, radio, server, etc.) may perform the method 100. In some embodiments, a user may perform one or more operations in the method 100. In some embodiments, the processor may perform one or more operations in the method 100 in response to user input. The method 100 may begin at operation 102, where the processor may receive an electronic message sent to a user on a first device. In some embodiments, the electronic message may have a first format.

After operation 102, the method 100 may continue to operation 104. At operation 104, the processor may receive usage information about the first device and a second device. In some embodiments, the usage information may be how often a user has moved a device in a period of time, how long ago the user used the device, how long the device has been looked at by the user, etc. After receiving the usage information about the first and second devices at operation 104, the method 100 may continue to decision block 106. At decision block 106, the processor may determine whether to send the electronic message to the second device. Decision block 106 is discussed further hereinafter with respect to FIG. 2. In some embodiments, if at decision block 106, it is determined that the electronic message cannot be sent to the second device, or if the first device is preferred over the second device, the processor may send the message to the first device and the method 100 may end. In some embodiments, the processor may determine whether to send the electronic message to the second device based on the usage information received about the first and second devices.

For example, a processor may receive information from a first device, a cellphone, indicating that the cellphone is not moving (e.g., the cellphone has been placed on a desk by the user, etc.). The processor may also receive information from a second device, a smart watch, indicating that the smart watch is moving (e.g., due to the user's arm swinging while walking, etc.). The processor may determine that the smart watch should be the target device to send an electronic message to in order for the user to have automatic access to the electronic message instead of the user having to return to the cellphone in order to receive the electronic message.

After decision block 106, the method 100 may continue to decision block 108. At decision block 108, the processor may determine if the second device is capable of receiving the electronic message in a second format. In some embodiments, if at decision block 108 the processor determines that the second device is not capable of receiving the electronic message in a second format, the processor may transmit the electronic message to the first device and the method 100 may end. For example, the processor may determine that the second device is only capable of receiving an electronic message in a format, which the processor cannot transform the first format into (e.g., the processor does not support transforming a two-dimensional drawing into a three-dimensional because the processor is missing the third dimensional constraint). In some embodiments, if at decision block 108 the processor determines that the second format is the same as the first format, the method 100 may end by the processor forwarding the electronic message in the first format to the second device.

In some embodiments, if at decision block 108 the processor determines that the second device is capable of receiving the electronic message in a second format, the method 100 may continue to decision block 110. At decision block 110, the processor may determine whether to transform the electronic message from the first format to the second format. For example, a processor may receive an electronic message for delivery to a first device in a Portable Document Format (PDF). The processor may determine a user is currently using a second device. The processor may determine that the second device is capable of using an Open Document Format (ODF), but not PDF, and it may determine to transform the PDF version of the electronic message to an ODF version. In some embodiments, if it is determined not to transform the electronic message, the processor may transmit the untransformed message to the second device, and the method 100 may end.

After determining whether to transform the electronic message from the first format to the second format at decision block 110, the method 100 may continue to operation 112. At operation 112, the processor may transmit the transformed electronic message to the second device. Following the example above, the processor may deliver the ODF version of the electronic message to the second device. This may allow the user to receive the electronic message without having to return to the first device to view the message. The method 100 may end after transmitting the transformed electronic message to the second device at operation 112.

Figure 2:
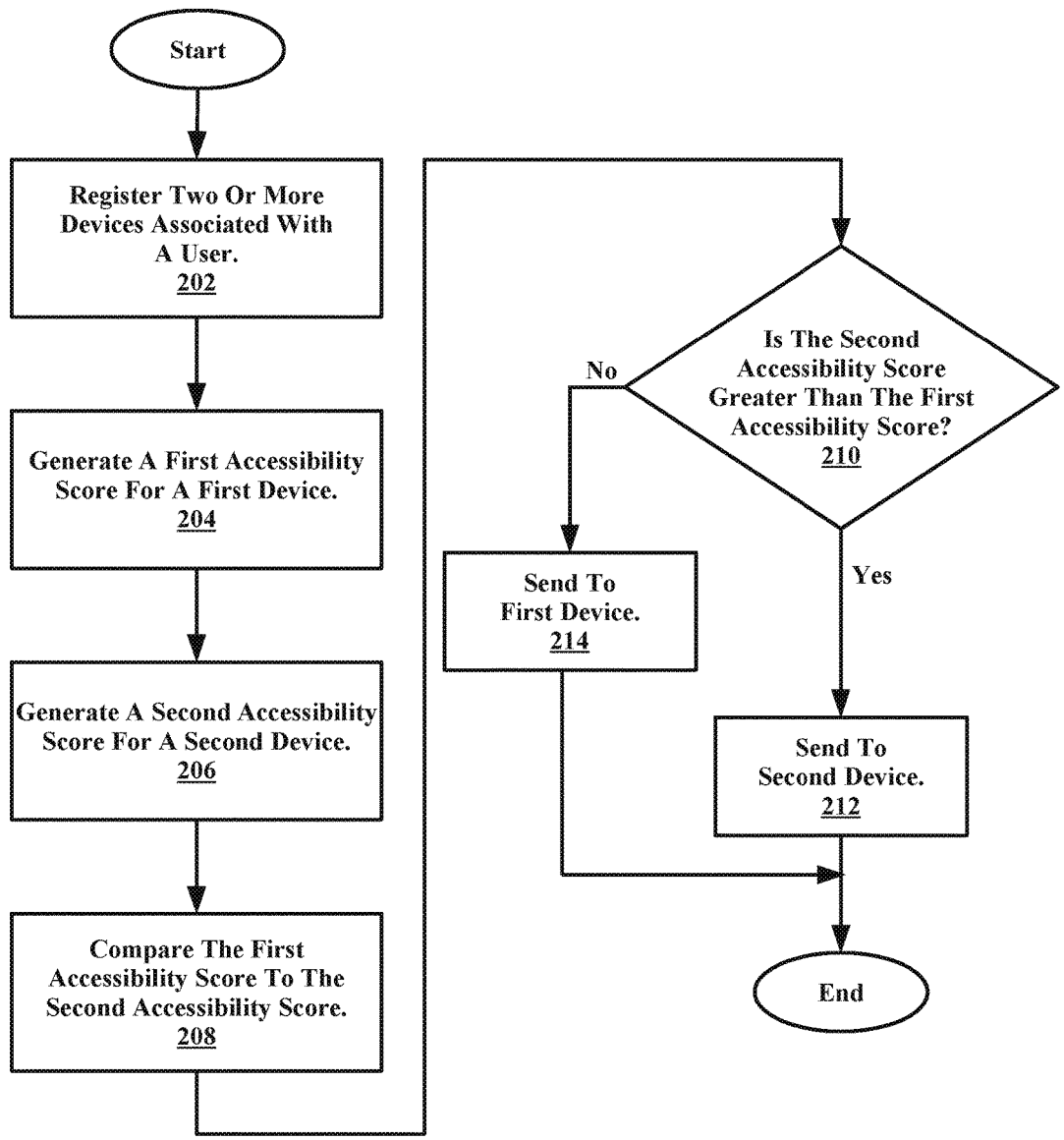
FIG. 2 illustrates a flowchart of an example method for determining whether to send an electronic message to a second device, in accordance with embodiments of the present disclosure.

Referring now to FIG. 2, illustrated is a flowchart of an example method 200 for determining whether to send an electronic message to a second device, according to embodiments of the present disclosure. A processor on a device may perform the method 200. In some embodiments, a user may perform one or more operations in the method 200. The method 200 may begin at operation 202 where two or more devices associated with a user may be registered. In some embodiments, the processor may register the devices based on a unique user identifier (e.g., a number given to the user, etc.). In some embodiments, the user may register the devices as associated with the user (e.g., register with a website, security service, etc.). In some embodiments, the devices may be registered and stored as being associated with the user in a database table.

After registering two or more devices associated with the user at operation 202, the method 200 may continue to operation 204. At operation 204, the processor may generate a first accessibility score for a first device. After generating a first accessibility score at operation 204, the method 200 may continue to operation 206. At operation 206, the processor may generate a second accessibility score for a second device.

In some embodiments, the first and second accessibility scores may be based on usage information received at operation 104 in FIG. 1. In some embodiments, the usage information may be any information about interactions a user has had with the first and second devices. In some embodiments, the usage information may include how long the user has been looking (e.g., gazing, staring, etc.) at the devices (e.g., detectable by eye-gazing technology), how often the user has touched a screen of the devices (e.g., detectable by the devices' touchscreen), how many times the user has moved one of the devices (e.g., detectable by a gyroscope in the devices), and/or power state information from each device (e.g., are the devices turned on or off). In some embodiments, the processor may determine a first count for the first device and a second count for the second device based on the above information received.

In some embodiments, the usage information may include how long the user has been looking at the devices over a set period of time (e.g., amount of time gazed out of an hour, a minute, etc.), how often the user has touched a screen of the devices over a set period of time (e.g., touches per hour, minute, etc.), how many times the user has moved on of the devices (e.g., number of movements per hour, minute, etc.), and/or power state information over a set period of time (e.g., how long has a device remained on for a day, how long has a device has remained off for a day, etc.). In some embodiments, the processor may determine a first count for the first device and a second count for the second device based on the above information received.

As discussed herein, in some embodiments the accessibility score may be generated based on, among other things, the capabilities of each associated device, usage information, state information about each associated device, and/or message format. For example, a first device that supports audiovisual messages (e.g., both audio and text) may be ranked higher than a second device that only audio. As another example, a cell phone that is a powered off state may receive a lower score than a smart TV that is turned on. In some embodiments, the accessibility score may be based on a combination of two or more these factors. For example, if the message is an .MP4 message (a format that supports both audio and video), devices that support both audio and video may be scored higher than devices that only support audio and devices that only support video/images.

In some embodiments, a user may weight a given factor (e.g., battery state) or device (e.g., cell phone). The processor may use the score each factor for a particular device and then combine the scores, using any assigned weighting coefficient, to generate the accessibility scores. For example, the user may decide that the battery state of the device is more important than the usage information (e.g., how often the device has been used in the last hour). Accordingly, a device that scores relatively low in the usage information category (e.g., has not been used as recently as a second device) may nevertheless have a higher accessibility score than the second device if it has a high battery state (e.g., is powered on) and the second device has a low battery state (e.g., near dead battery or powered off). Likewise, a user may weight his cell phone as his preferred device (e.g., because he usually has it on him). Therefore, even if the cell phone has a low battery and the user's laptop has a full battery, the cell phone may be prioritized (e.g., have a higher accessibility score) because the user has identified it as preferred.

After generating the second accessibility score at operation 206, the method 200 may continue to operation 208. At operation 208, the processor may compare the first accessibility score to the second accessibility score. For example, a processor may receive usage information in the form of device movement over a set time. The first device may have been moved by a user 5 times in the last 15 minutes and the second device may have been moved by a user 40 times in the last 15 minutes. The processor may be programmed to increase a counter for each device for every time the device was moved (e.g., the first device has an accessibility score of 5 and the second device has an accessibility score of 40). The processor may then compare the 5 accessibility score of the first device to the 40 accessibility score of the second device.

After comparing the first accessibility score to the second accessibility score at operation 208, the method 200 may continue to decision block 210. At decision block 210, the processor may determine if the second accessibility score is greater than the first accessibility score. Following the example above, the processor may determine, based on the comparing of the first and second accessibility scores, that the second device is interacted with by the user more than the first device (e.g., the second accessibility score is higher than the first accessibility score) and may be more likely to be currently accessible to the user.

If at decision block 210 the second accessibility score is determined to be greater than the first accessibility score, the method 200 may process to operation 212 where the electronic message is sent to the second device. If at decision block 210 the second accessibility score is determined to be less than the first accessibility score, the method 200 may proceed to operation 214 where the electronic message is sent to the first device. In some embodiments, at operation 214 the electronic message may be sent to the first device in the first format. In some embodiments, the processor may determine a rank for the first and second devices based on the first and second accessibility scores, respectively.

In some embodiments, a user may be associated with more than two devices. In these embodiments, the processor may generate accessibility scores for each device (or for a subset of the devices). The scored devices may then be ranked according to their accessibility scores, and the message may be sent to the device with the highest accessibility score. In some embodiments, the electronic message may only be sent to a second device (e.g., a device other than the one originally sent to) if the accessibility score of the second device exceeds the accessibility score of the first device by a threshold amount (e.g., a scalar amount or a percentage). The threshold may be set by a user, or heuristically by the processor using historical information. In some embodiments, the electronic message may only be sent to a second device if the first device has not been used within a particular amount of time. For example, even if the second device has a higher accessibility score, if the user has interacted with the first device within a particular amount of time (e.g., in the last 5 minutes), the message may be sent to the first device and not the second device. Alternatively, in some embodiments the message may be sent to both the first and second devices.

Figure 3:
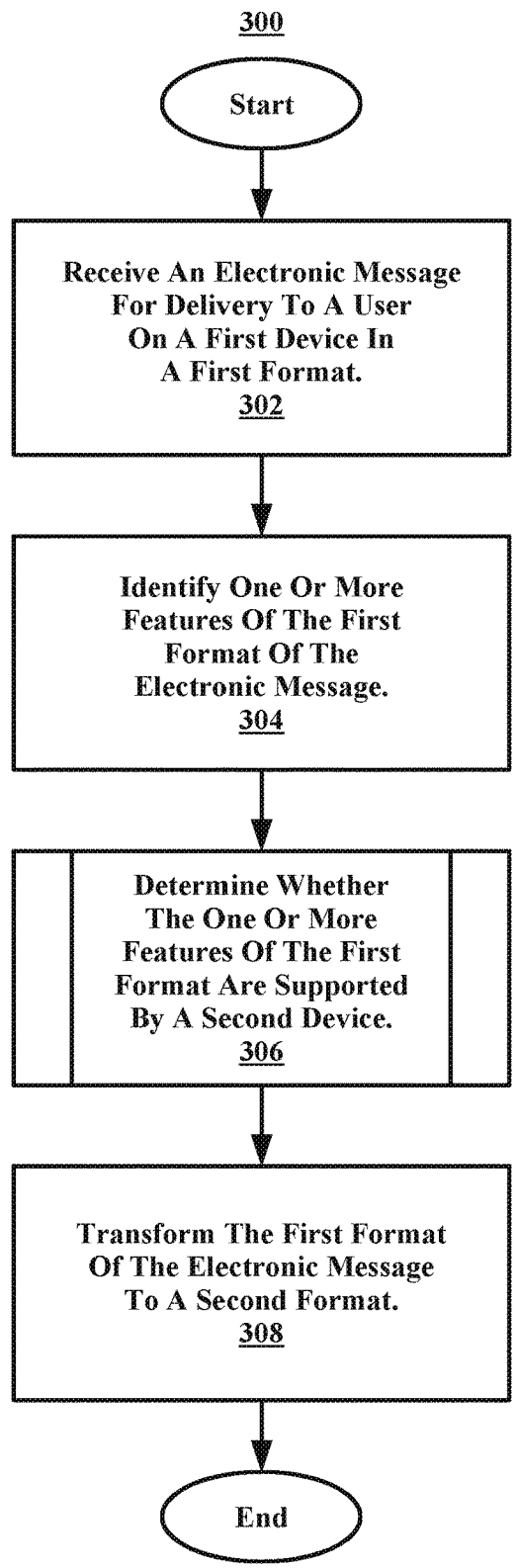
FIG. 3 illustrates a flowchart of an example method for transforming a first format of an electronic message to a second format, in accordance with embodiments of the present disclosure.

Referring now to FIG. 3, illustrated is a flowchart of an example method 300 for transforming a first format of an electronic message to a second format, according to embodiments of the present disclosure. A processor (e.g., in a system, computer system, server, etc.) may perform the method 300. In some embodiments, a user may perform one or more operations in the method 300. In some embodiments, a processor may perform one or more operations in the method 300 in response to user input. The method 300 may begin at operation 302 where the processor may receive an electronic message for delivery to a user on a first device in a first format.

After receiving the electronic message for delivery to the user on the first device in the first format at operation 302, the method 300 may continue to operation 304. At operation 304, the processor may identify one or more features of the electronic message. For example, a processor may receive an electronic message in Rich Text Format (RTF). The processor may identify the features of an RTF as having the ability to format text and add image in text.

After identifying one or more features of the first format of the electronic message at operation 304, the method 300 may continue to operation 306. At operation 306, the processor may determine whether the one or more features of the first format are supported by a second device (e.g., the usability of the one or more features of the first format by the second device). Operation 306 is discussed further hereinafter with respect to FIG. 4. In some embodiments, the processor may identify a second device to determine usability of features by receiving user usage information from the second device indicating that the second device is currently accessible to the user. In some embodiments, there may be more that two devices, for example, the method 300 may determine usability of the features of the first format for all devices owned by a user (e.g., a first device, a second device, a third device, a fourth device, etc.).

After determining whether the one or more features of the first format are supported by a second device at operation 306, the method 300 may continue to operation 308. At operation 308, the processor may transform the electronic message to a second format. In some embodiments, transforming the electronic message to a second format may include hiding or removing features of the electronic message that are not supported by the second format. In some embodiments, transforming the electronic message to a second format may include adding features supported by the second format that are not supported by the first format.

For example, a processor may receive an electronic message for delivery to a user on a cellphone in a Moving Picture Experts Group (MPEG) audio-visual format. The processor may identify the features of the MPEG audio-visual format as having the ability to display visual graphics to a user and the ability to broadcast aural frequencies to the user. The processor may also determine that a computer is currently being used by the user and may be a better choice to deliver the electronic message to than the cellphone. The processor may determine that the display and aural features of the MPEG audio-visual format are supported by the computer.

The processor may transform the MPEG audio-visual format to an appropriate format with added features supported by the computer. The processor may transform the MPEG audio-visual format by separating the audio and visual features of the MPEG, running a speech-to-text program, and adding subtitles to the visual feature when playing the electronic message on the computer. In some embodiments, the processor may enhance the visual feature of the MPEG (e.g., upscale/upconvert, convert to MP4) because the computer may have a higher resolution than the cellphone. In some embodiments, the processor may add features supported by the second format in addition to removing features not supported by the second format.

In some embodiments, the processor may identify one or more documents associated with the electronic message. In some embodiments, the processor may insert one or more identifiers (e.g., links, recommendations, symbols, etc.) corresponding to the one or more documents into the electronic message. In some embodiments, the processor may intelligently search (e.g., using search features of the first or second devices, applications found in a system, the Internet, etc.) for other documents, objects, videos, pictures, etc. that are comparable to the first format (e.g., the MPEG).

For example, the processor may separate the audio and visual features of the MPEG and generate a written document from the audio portion. The processor may compare the written document to other transcripts found by the processor to determine that the MPEG is apart of a movie named, "Hit Summer Movie." The processor may insert a link (e.g., identifier) to "Hit Summer Movie" in the electronic message displayed to the user in order for the user to fully understand the context of the electronic message. In some embodiments, the processor may insert a link to other media associated with "Hit Summer Movie." This may be done in order for the user to have access to other media that they may enjoy. In some embodiments, the processor may use the visual portion to compare against other known media, videos, etc.

Figure 4:
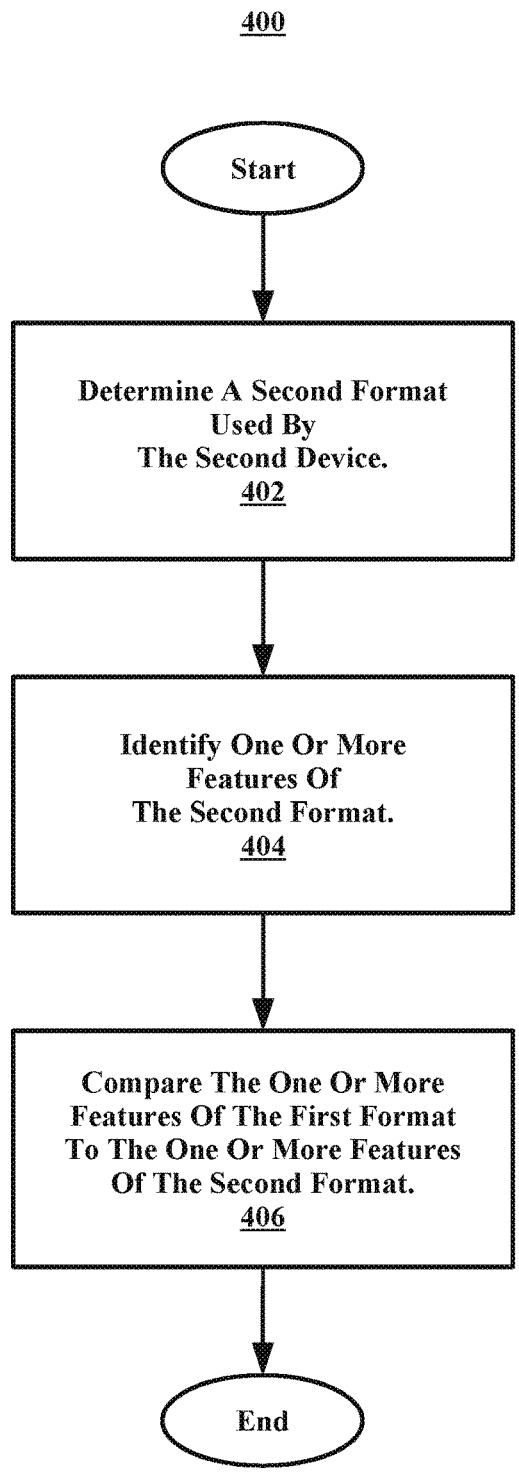
FIG. 4 illustrates a flowchart of an example method for determining whether the one or more features of the first format are supported by a second device, in accordance with embodiments of the present disclosure.

Referring now to FIG. 4, illustrated is a flowchart of an example method 400 for determining whether the one or more features of the first format on a second device, according to embodiments of the present disclosure. A processor may perform the method 400. In some embodiments, a user may perform one or more operations in the method 400. The method 400 may begin at operation 402 where the processor may determine a second format used by the second device.

After determining a second format used by the second device at operation 402, the method 400 may continue to operation 404. At operation 404, the processor may identify one or more features of the second format. After identifying one or more features of the second format, the method 400 may continue to operation 406. At operation 406, the processor may compare the one or more features of the first format to the one or more features of the second format.

For example, a processor may receive an electronic message with document attachments for delivery to a first device. The first device may use a first format that supports the features of audio output, visual display, and automatic attachment opening. The processor may also receive information from a second device indicating that a user is currently using the second device. The processor may determine a second format used by the second device.

The processor device may identify the second format as supporting visual display, automatic attachment opening, and automatic recognition of misspelled words in attachments. The processor may compare the features of the first format and the features of the second format. The processor may determine that the visual display and automatic attachment opening features of the first format are supported on the second device.

The processor may transform the first format of the electronic message to the second format supported by the second device by hiding the audio output feature and adding the automatic recognition feature. The user may receive the electronic message on the second device as a visual text message with all attachments already opened and misspelled words highlighted in the attachments for the user to easily identify and change issues in the attachments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
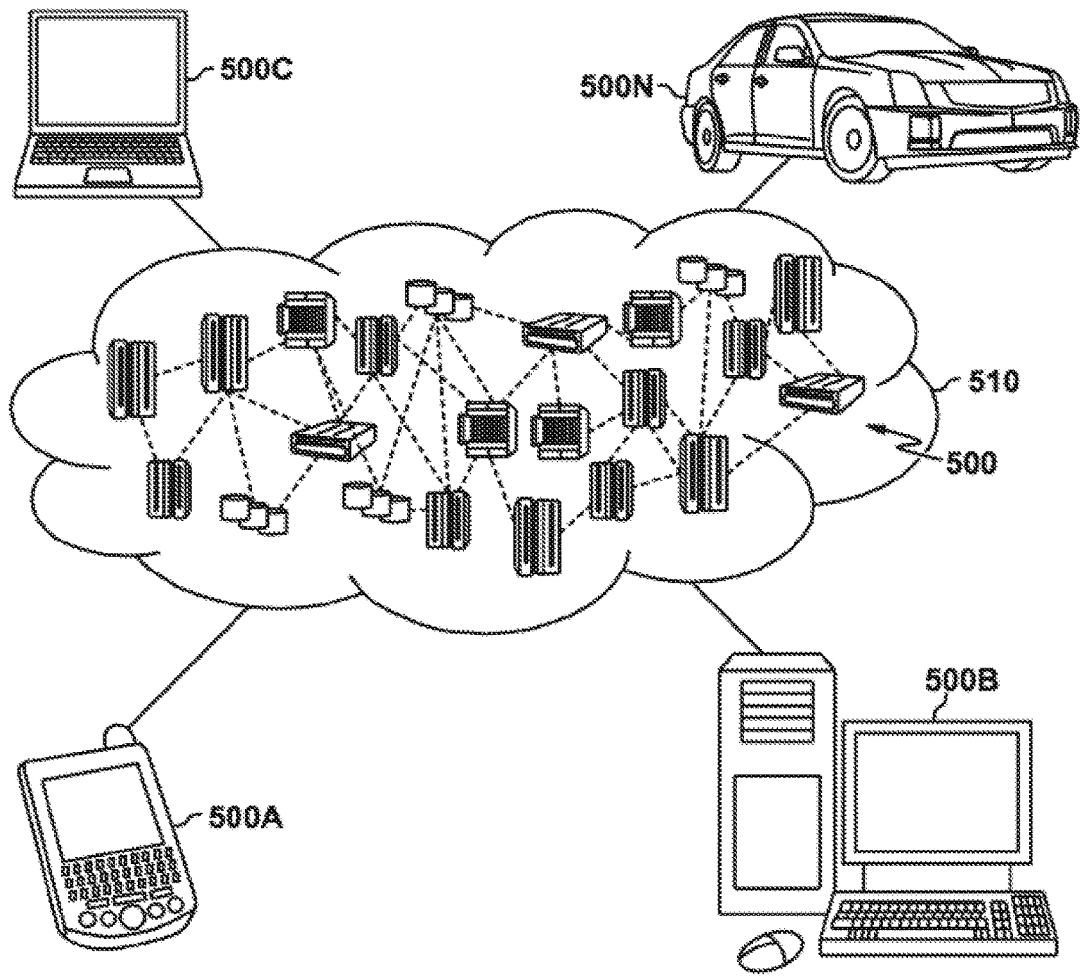
FIG. 5 depicts a cloud computing environment according to an embodiment of the present invention, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
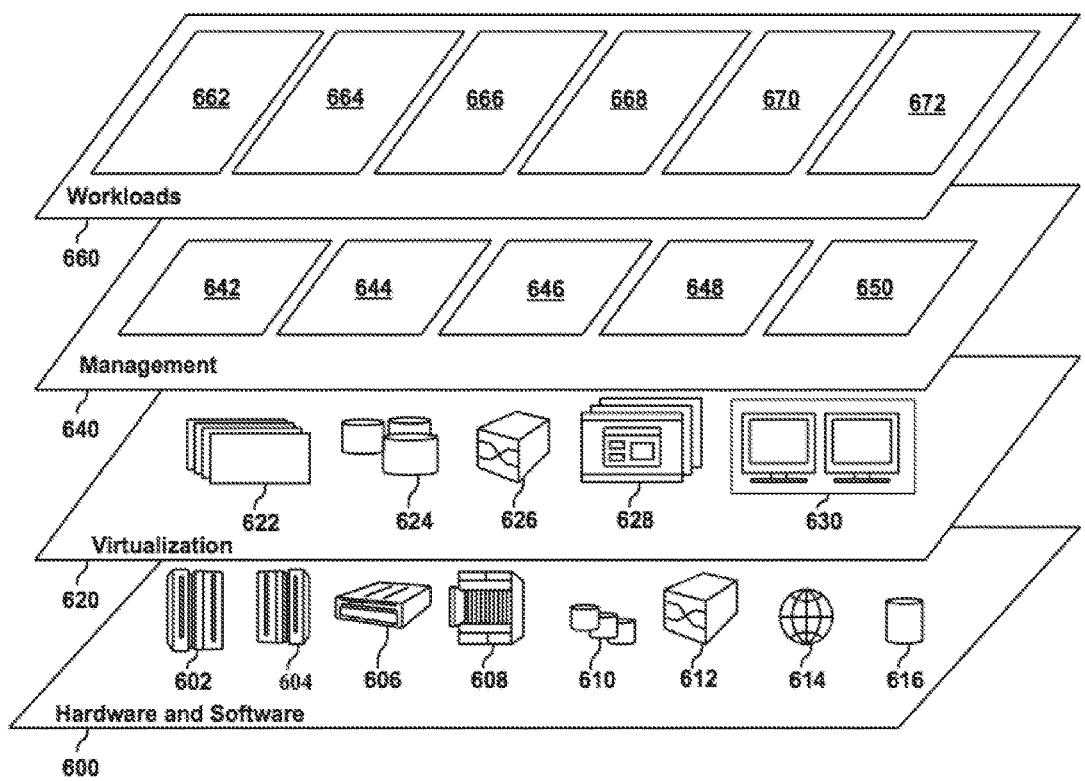
FIG. 6 depicts abstraction model layers according to an embodiment of the present invention, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the invention are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and transforming a first format of an electronic message to a second format 672.

Figure 7:
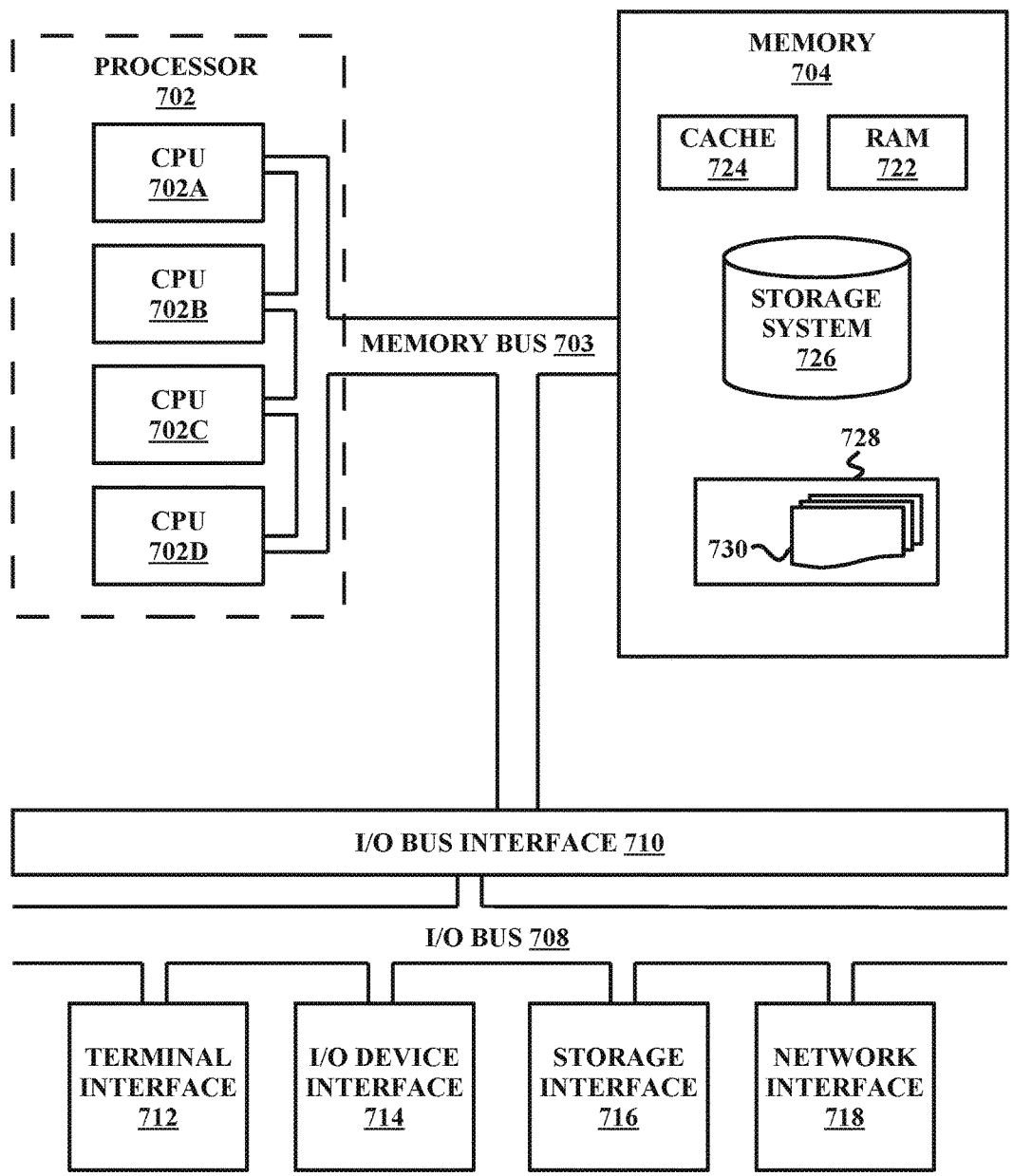
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

Figure 8:
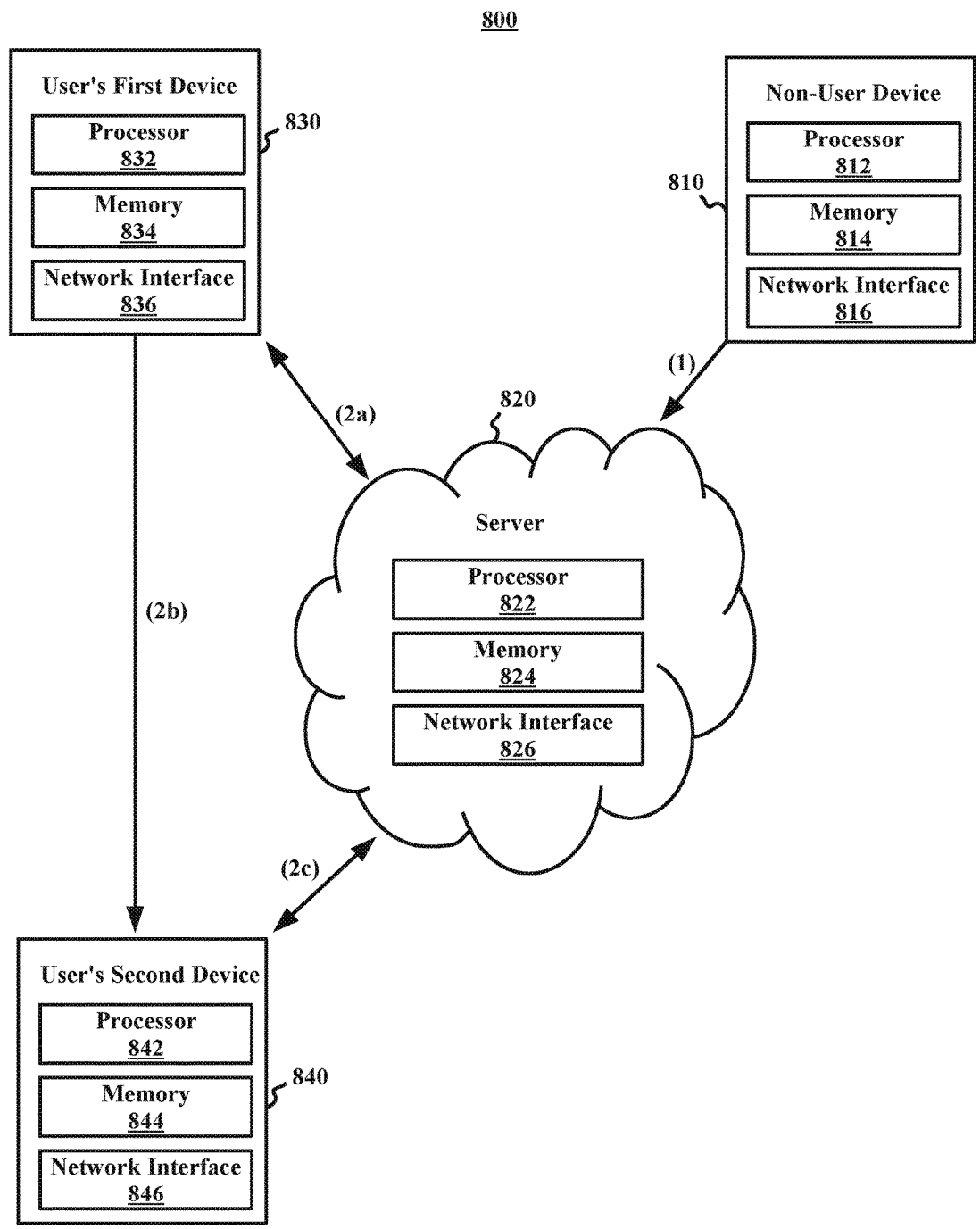
FIG. 8 illustrates a block diagram of an example system for an electronic message to be transformed and transmitted to a second device, in accordance with embodiments of the present disclosure.

Referring now to FIG. 8, illustrated a block diagram of an example system 800 for an electronic message to be transformed and transmitted to a second device, according to embodiments of the present disclosure. The system 800 may include a non-user device 810, a server 820, a user's first device 830, and a user's second device 840.

Consistent with various embodiments, the non-user device 810 may include a processor 812, a memory 814, and a network interface 816. The server 820 may include a processor 822, a memory 824, and a network interface 826. The user's first device 830 may include a processor 832, a memory 834, and a network interface 836. The user's second device 840 may include a processor 842, a memory 844, and a network interface 846. In some embodiments, the network interfaces 816, 826, 836, and 846 may be, e.g., modems or network interface cards. In some embodiments, the non-user device 810, the server 820, the user's first device 830, and the user's second device 840 may all communicate through via a network (not shown).

In some embodiments, the network can be implemented using any number of any suitable communications media. For example, the network may be, but is not limited to, a wide area network (WAN), a local area network (LAN), an internet, an intranet, the Internet, one or more hardwire connections (e.g., Ethernet connections), a wireless link or router, any other suitable wireless or wired communication link, or any combination thereof. In some embodiments, the network can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network.

In some embodiments, the system 800 may begin operating at step 1 where the non-user device 810 (e.g., a device not associated/registered with the user) sends an electronic message to a user on the user's first device 830. In some embodiments, the server 820 (e.g., a server operated by a telecommunication or internet provider) may receive the electronic message sent to the user. The system 800 may continue to steps 2a and 2c, where the processor 822 may query for usage information from the user's first device 830 and the user's second device 840.

The user's first device 830 may send the usage information, which in some embodiments may include a first accessibility count, to the server 820. The user's second device 840 may likewise send the usage information, which in some embodiments may include a second accessibility count, to the server 820. In some embodiments, the user's first device 830 and the user's second device 840 may have the usage information stored in the memories 834 and 844, respectively. In some embodiments, the processors 832 and 842 may access the usage information form the memories 834 and 844, respectively.

In some embodiments, the step 2a may be skipped and the system 800 may continue to step 2b where the user's first device 830 may send its usage information to the user's second device 840. The system 800 may continue to step 2c where the user's second device 840 may transfer both the usage information for the user's first device 830 and the user's second device 840 to the server 820. In some embodiments, step 2b may be performed in order for the user's second device 840 to determine whether it is currently being used or is more accessible than the user's first device 830. In some embodiments, if the user's second device 840 determines at step 2b that is currently being used or more accessible than the user's first device 830, the user's second device 840 may determine, for the system 800, whether to proceed to step 2c.

Upon the server 820 receiving the usage information at steps 2a and 2c (or at step 2c following step 2b), the server 820 may determine to send the electronic message to the user's second device 840 (e.g., the server 820 may identify an accessibility count as higher for the user's second device 840). After the server 820 determines to send the electronic message to the user's second device 840, the processor 822 may transform the electronic message from a first format to a second format and transmit the electronic message in the second format to the user's second device 840.

In some embodiments, at steps 2a and 2c the server 820 may also receive information describing the features supported by the first format of the electronic message used by the user's first device 830 and features supported by the second format used by the user's second device 840. The processor 822 in the server 820 may determine the usability of the features of the first format on the user's second device 840. In some embodiments, the supported features of the first and second devices 830 and 840 may be stored by the server 820 (e.g., in a database table). Upon determining the usability, the server 820, using the processor 822 may transform the electronic message to the second format used by the second device.

In some embodiments, the server 820 may receive usage information and usability of features information from the user's second device 840 at step 2c. In some embodiments, the user's first device 830 may send its usage information and information regarding the features of the first format used by the user's first device 830 to the user's second device 840. The user's second device 840 may store the information on the memory 844, and using the processor 842 determine the features supported by the second format of the electronic message and whether the first or second accessibility count is higher. The processor 842 may sent the already processed information (e.g., which count is higher and usability information) to the server 820. In some embodiments, the server may then determine whether or not to transform the electronic message to a second format and which device to send the electronic message.

In some embodiments, a processor may receive an electronic message sent to a first device associated with a user. The electronic message may have a first format. The processor may receive usage information about the first device and a second device associated with the user. The processor may determine whether to send the electronic message to the second device based on the received usage information. The second device may be capable of receiving messages having a second format. The processor may determine, in response to determining to send the electronic message to the second device, whether to transform the electronic message from the first format to the second format. The processor may transform, in response to determining to transform the electronic message, the electronic message to the second format. The processor may transmit the transformed electronic message to the second device.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving an electronic message for delivery to a user on a first device, the electronic message having a first format;
receiving usage information about the first device and a second device,
wherein the usage information about the first and second devices includes user interaction information, and
wherein receiving usage information about the first and second devices comprises:
determining a first accessibility score for the first device based on the user interaction information for the first device, wherein the user interaction information includes the number of times the user interacted with the first device in a particular time period; and
determining a second accessibility score for the second device based on the user interaction information for the second device, wherein the user interaction information includes the number of times the user interacted with the second device in the particular time period;
determining to send the electronic message to the second device based on the received usage information, the second device being capable of receiving the electronic message in a second format;
identifying one or more features of the first format of the electronic message;
determining whether the one or more features of the first format are supported by the second device;
transforming the first format of the electronic message to the second format used by the second device; and
transmitting the second format of the electronic message to the second device.

2. The method of claim 1, wherein determining whether the one or more features of the first format are supported by the second device further comprises:
determining the second format used by the second device;
identifying one or more features of the second format; and
comparing the one or more features of the first format to the one or more features of the second format.

3. The method of claim 2, wherein comparing the one or more features of the first format to the one or more features of the second format comprises:
determining that at least one of the one or more features of the first format is supported by the second format; and
determining that at least one of the one or more features of the first format is not supported by the second format.

4. The method of claim 1, wherein transforming the first format of the electronic message to the second format further comprises:
determining the one or more features of the first format, wherein the one or more features of the first format include an audio feature, a text feature, and a video feature;
determining one or more features of the second format, wherein the one or more features of the second format include the video feature, a frame-rate control feature, and a resolution control feature; and
removing at least one of the one or more features of the first format that are not supported by the second format.

5. The method of claim 4, the method further comprising:
adding at least one of the one or more features of the second format to the first format.

6. The method of claim 1, the method further comprising:
identifying one or more documents associated with the electronic message; and
inserting one or more identifiers corresponding to the one or more documents into the electronic message.

7. The method of claim 1, wherein transforming the first format of the electronic message to the second format further comprises:
generating a copy of the electronic message, wherein the copy of the electronic message includes the first format of the electronic message;
storing, in a user-accessible storage device, the copy of the electronic message in the first format; and transforming the electronic message to the second format, wherein the copy of the electronic message remains in the first format during the transforming of the electronic message to the second format.

\* \* \* \* \*